United States Patent
Liu et al.

(10) Patent No.: US 11,301,470 B2
(45) Date of Patent: Apr. 12, 2022

(54) CONTROL METHOD FOR PERFORMING MULTI-TABLE JOIN OPERATION AND CORRESPONDING APPARATUS

(71) Applicant: HUAWEI TECHNOLOGIES CO., LTD., Guangdong (CN)

(72) Inventors: Wenjie Liu, Hong Kong (CN); Jiansheng Wei, Shenzhen (CN); Xiaofei Zhang, Hong Kong (CN); Lei Chen, Hong Kong (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 267 days.

(21) Appl. No.: 16/370,343

(22) Filed: Mar. 29, 2019

(65) Prior Publication Data

US 2019/0228014 A1 Jul. 25, 2019

Related U.S. Application Data

(63) Continuation of application No. PCT/CN2016/101366, filed on Sep. 30, 2016.

(51) Int. Cl.
*G06F 16/2453* (2019.01)
*G06F 16/00* (2019.01)
(Continued)

(52) U.S. Cl.
CPC ........ *G06F 16/24544* (2019.01); *G06F 16/00* (2019.01); *G06F 16/2282* (2019.01); *G06F 16/2456* (2019.01); *G06F 16/24537* (2019.01)

(58) Field of Classification Search
CPC ............... G06F 16/24544; G06F 16/00; G06F 16/24537; G06F 16/2282; G06F 16/2456
See application file for complete search history.

(56) References Cited

U.S. PATENT DOCUMENTS 7,908,242 B1 * 3/2011 Achanta .............. G06F 16/2453
707/602
2003/0078909 A1 * 4/2003 Pham ................ G06F 16/24544
(Continued)

FOREIGN PATENT DOCUMENTS

CN 101840430 A 9/2010
CN 102081678 A 6/2011
(Continued)

OTHER PUBLICATIONS

Pei Ou-ya et al. A nested query strategy oriented massive distributed database, Journal of East China Normal University(Natural Science), No. 5 ,Sep. 2014. pp. 271-280. with English abstract.
(Continued)

*Primary Examiner* — Ashish Thomas
*Assistant Examiner* — Yohanes D Kelemework
(74) *Attorney, Agent, or Firm* — Womble Bond Dickinson (US) LLP

(57) ABSTRACT

A control method for performing a multi-table join operation and a corresponding apparatus are disclosed. Fields in a table whose fields participating in a theta join operation and used in the query statement meet a first preset condition are decomposed, to obtain a plurality of first field groups, so that the theta join operation can be implemented in steps in a form of the plurality of field groups. This can reduce a data amount of Cartesian product calculation during one join operation, greatly reduce network transmission overheads, computing overheads, and memory overheads, and improve execution efficiency.

20 Claims, 9 Drawing Sheets

(51) Int. Cl.
*G06F 16/22* (2019.01)
*G06F 16/2455* (2019.01)

(56) References Cited

U.S. PATENT DOCUMENTS

| | | | |
|---|---|---|---|
| 2005/0131893 | A1 | 6/2005 | Von Glan |
| 2006/0218123 | A1* | 9/2006 | Chowdhuri ....... G06F 16/24532 |
| 2008/0071748 | A1* | 3/2008 | Wroblewski ........ G06F 16/2282 |
| 2011/0213778 | A1 | 9/2011 | Hess et al. |
| 2011/0302151 | A1* | 12/2011 | Abadi ................. G06F 16/2456 |
| | | | 707/714 |
| 2012/0030246 | A1* | 2/2012 | Herrnstadt ............ G06F 16/221 |
| | | | 707/798 |
| 2015/0234895 | A1* | 8/2015 | Erdogan ........... G06F 16/24542 |
| | | | 707/714 |
| 2016/0055207 | A1* | 2/2016 | Chawda ........... G06F 16/24544 |
| | | | 707/714 |
| 2017/0147644 | A1* | 5/2017 | Lee ......................... G06F 16/00 |
| 2017/0228425 | A1* | 8/2017 | Kandula ................ G06N 7/005 |

FOREIGN PATENT DOCUMENTS

| | | |
|---|---|---|
| CN | 102262675 A | 11/2011 |
| CN | 102467521 A | 5/2012 |
| CN | 102521406 A | 6/2012 |
| CN | 105930407 A | 9/2016 |
| WO | 2015/184762 A1 | 12/2015 |

OTHER PUBLICATIONS

Lakshmikant Shrinivas et al. Materialization Strategies in the Vertica Analytic Database: Lessons Learned, ICDE Conference 2013, pp. 1196-1207.

Alper Okcan et al. Processing Theta-Joins using MapReduce, SIGMOD'11, Jun. 12-16, 2011, total 12 pages.

* cited by examiner

CONTROL METHOD FOR PERFORMING MULTI-TABLE JOIN OPERATION AND CORRESPONDING APPARATUS

CROSS-REFERENCE TO RELATED APPLICATIONS

This application is a continuation of International Application No. PCT/CN2016/101366, filed on Sep. 30, 2016, the disclosure of which is hereby incorporated by reference in its entirety.

TECHNICAL FIELD

The present disclosure relates to the field of computer technologies, and more specifically, to a database multi-table join query technology.

BACKGROUND

A relational database is a database created based on a relational model, where the relational model is a two-dimensional table model, and is used to organize data into a plurality of tables including rows and columns. During storage of a table in the relational database, because sequential addressing of a one-dimensional structure is used for a computer memory, rows of data in the table may be input one by one (namely, row store), or columns of data in the table may be imported in batches (namely, column store).

After tables in the relational database are stored, a plurality of join operations may be performed on the tables based on relational algebra. For example, a theta join is performed on two tables, that is, fields that are in the two tables and that meet a theta condition are combined.

Currently, in a relational database system based on a distributed computing framework, a storage system and a database query engine are usually independent of each other, and the database query engine cannot know an organization manner of data in the storage system. Therefore, when a theta join operation is performed, according to a query statement, on tables stored in the storage system, usually, all fields that are in the tables and that are used in the query statement need to be read first, and a Cartesian product needs to be calculated; and then, a join result is obtained through filtering based on a query condition. When the theta join operation is performed on relatively large tables, calculating a Cartesian product of all the fields that are in the tables and that are used in the query statement causes an explosively growing amount of data computation. Consequently, computing overheads, memory overheads, and inter-node network transmission overheads are greatly increased, and performance is seriously degraded.

SUMMARY

In view of this, the present disclosure provides a control method for performing a multi-table join operation and a corresponding apparatus, to resolve a prior-art problem of poor performance and large computing overheads, memory overheads, and inter-node network transmission overheads due to an explosively growing amount of data computation that is caused by calculation of a Cartesian product for all fields that are in tables and that are used in a query statement during a multi-table theta join operation.

To achieve the foregoing objective, the following solutions are provided:

One embodiment of the present disclosure provides a control method for performing a multi-table join operation, including the following operations:

parsing a query statement, to obtain query conditions, table names, and fields that are in tables corresponding to the table names and that are used in the query statement;

decomposing fields in each first type table that are used in the query statement, to obtain a plurality of first field groups of each first type table, where a table whose fields that participate in a theta join operation as indicated in the query conditions and that are used in the query statement meet a first preset condition is a first type table, and the first preset condition is used to indicate that a data computation amount exceeds a preset threshold due to Cartesian product calculation when the theta join operation is performed on the fields in the table that are used in the query statement;

obtaining a second field group of each second type table in a manner of forming one second field group by using a field that is in each second type table and that is used in the query statement, where the second type table is a table, other than the first type table, in the tables corresponding to the table names; and generating an execution plan based on the query statement, the first field groups, and the second field group, where the execution plan is used to control to read data corresponding to fields in the first field groups and the second field group, and perform, on the read data according to execution operations, a join operation that meets an execution condition, to obtain a query result that meets a requirement of the query statement.

It can be learned, from the foregoing process, that the fields in the table whose fields participating in the theta join operation and used in the query statement meet the first preset condition are decomposed to obtain a plurality of first field groups, so that the theta join operation is implemented in steps in a form of the plurality of field groups. This can reduce a data amount of Cartesian product calculation during one join operation, greatly reduce network transmission overheads, computing overheads, and memory overheads, and improve execution efficiency.

One embodiment of the present disclosure discloses an optimizer, including: a memory, configured to store a program and data generated during program running; and a processor, configured to run the program in the memory, to implement the following functions:

parsing a query statement, to obtain query conditions, table names, and fields that are in tables corresponding to the table names and that are used in the query statement; decomposing fields in each first type table that are used in the query statement, to obtain a plurality of first field groups of each first type table; obtaining a second field group of each second type table in a manner of forming one second field group by using a field that is in each second type table and that is used in the query statement; and generating an execution plan based on the query statement, the first field groups, and the second field group.

A table whose fields that participate in a theta join operation as indicated in the query conditions and that are used in the query statement meet a first preset condition is a first type table; the first preset condition is used to indicate that a data computation amount exceeds a preset threshold due to Cartesian product calculation when the theta join operation is performed on the fields in the table that are used in the query statement; the second type table is a table, other than the first type table, in the tables corresponding to the table names; and the execution plan is used to control to read data corresponding to fields in the first field groups and the second field group, and perform, on the read data according to execution operations, a join operation that meets an execution condition, to obtain a query result that meets a requirement of the query statement.

In an implementation, the first preset condition includes:
a quantity of fields in the table that are used in the query statement exceeds a first preset threshold;
storage overheads of the fields in the table that are used in the query statement exceed a first preset space threshold;
a quantity of fields in the table that are used in the query statement and that participate in the theta join operation exceeds a second preset threshold; or
storage overheads of fields in the table that are used in the query statement and that participate in the theta join operation exceed a second preset space threshold.

In an implementation, the decomposing fields in each first type table that are used in the query statement, to obtain a plurality of first field groups of each first type table includes:
for each first type table, separately forming a first subtype field group by using a primary key and a field that is in the table and that participates in the theta join operation, and forming a second subtype field group by using the primary key and a field that is in the table and that is used in the query statement but does not participate in the theta join operation, where
the generating an execution plan based on the query statement, the first field groups, and the second field group includes:
generating the execution plan based on the query statement, the first subtype field group, the second subtype field group, and the second field group, where the execution plan is used to control to read data corresponding to fields in the first subtype field group, the second subtype field group, and the second field group, and perform, on the read data according to the execution operations, the join operations that meet the execution conditions, to obtain the query result that meets the requirement of the query statement.

In an implementation, the forming a first subtype field group by using a primary key and a field that is in the table and that participates in the theta join operation includes:
forming one first subtype field group by using the primary key and all fields in the table that participate in the theta join operation; or
forming one first subtype field group by using the primary key and a field that is in the table and that is used to perform a theta join operation with a field in a same table.

In an implementation, the generating an execution plan based on the query statement, a first type field group, a second type field group, and a third type field group includes:
using the first type field group, the second type field group, and the third type field group as to-be-built field groups included in the execution plan;
generating a theta join execution condition and a primitive equal join execution condition of the execution conditions based on the query conditions in the query statement;
to meet the requirement of the query result corresponding to the query statement, using, as a derived equal join execution condition of the execution conditions, a condition for performing, by using a primary key of a first type table as an equal join parameter, an equal join on intermediate results that are generated by executing the query conditions on the first type field group and the second type field group; and
to meet the requirement of the query result corresponding to the query statement, using an execution sequence of the execution conditions as the execution operations.

In an implementation, after forming the first subtype field group and the second subtype field group, the following is further included:
if fields in a first subtype field group of a specific first type table are used to participate in a multi-table theta join operation, decomposing the first subtype field group according to a preset rule, to obtain a plurality of field groups, where the preset rule includes: a field that is in the first subtype field group and that is used to perform a theta join with a same table is decomposed as a field group, and a field shared by any two field groups obtained through decomposition meets a third preset condition, where the third preset condition is used to determine a correlation between two field groups formed through decomposition;
determining whether all the plurality of field groups obtained through decomposition include the primary key; and
if not all the plurality of field groups obtained through decomposition include the primary key, adding the primary key to a field group that includes no primary key, and returning to perform the operation of generating the execution plan based on the query statement, the first subtype field group, the second subtype field group, and the second field group; or
if all the plurality of field groups obtained through decomposition include the primary key, returning to perform the operation of generating the execution plan based on the query statement, the first subtype field group, the second subtype field group, and the second field group.

It can be learned from the foregoing process that, if a first subtype field group of a specific first type table is used to participate in a multi-table theta join, it indicates that fields in the first subtype field group may be further decomposed, to further reduce a quantity of fields that participate in the theta join operation.

In an implementation, before the generating the execution plan based on the query statement, the first subtype field group, the second subtype field group, and the second field group, the following is further included:
if fields in a first subtype field group of a specific first type table meet a second preset condition, decomposing the first subtype field group, to obtain a plurality of field groups;
determining whether all the plurality of field groups obtained by decomposing the first subtype field group that meets the second preset condition include the primary key; and
if not all the plurality of field groups obtained by decomposing the first subtype field group that meets the second preset condition include the primary key, adding the primary key to a field group that includes no primary key, and returning to perform the operation of generating the execution plan based on the query statement, the first subtype field group, the second subtype field group, and the second field group; or
if all the plurality of field groups obtained by decomposing the first subtype field group that meets the second preset condition include the primary key, returning to perform the operation of generating the execution plan based on the query statement, the first subtype field group, the second subtype field group, and the second field group.

It can be learned from the foregoing process that when it is determined that the fields in the first subtype field group meet the second preset condition, it indicates that a problem of an explosively growing amount of data computation in a Cartesian product execution process still occurs when the theta join operation is performed on the fields in the first type field group. Therefore, the fields in the first subtype field group are decomposed, to obtain the plurality of field groups, so that a quantity of fields that participate in the theta join operation is further reduced, and the data computation amount in the Cartesian product execution process is reduced.

In an implementation, the second preset condition includes:

a quantity of fields in the first subtype field group exceeds a third preset threshold; or storage overheads of the fields in the first subtype field group exceed a third preset space threshold.

One embodiment of the present disclosure provides a control method for performing a multi-table join operation, including the following operations:

receiving an execution plan, where the execution plan includes a to-be-built first field group, a to-be-built second field group, execution operations, and execution conditions;

reading data corresponding to fields in the to-be-built first field group and the to-be-built second field group;

grouping the read data based on the to-be-built first field group and the to-be-built second field group, to form field group data;

performing, on the field group data according to the execution operations, join operations that meet the execution conditions, to obtain a query result;

mapping the query result to an output field sequence; and sending the output field sequence.

It can be learned, from the foregoing process, that the read data is grouped based on the to-be-built first field group and the to-be-built second field group in the execution plan, to form the field group data, and the join operation is performed on the field group data, so that a theta join operation is implemented in steps in a form of a plurality of field groups. This can reduce a data amount of Cartesian product calculation during one join operation, greatly reduce network transmission overheads, computing overheads, and memory overheads, and improve execution efficiency.

One embodiment of the present disclosure discloses a server cluster, including n servers, where n is greater than or equal to 1, and each server includes a processor and a memory, where processors of the n servers form a distributed computing platform, configured to receive an execution plan, where the execution plan includes a to-be-built first field group, a to-be-built second field group, execution operations, and execution conditions; read data corresponding to fields in the to-be-built first field group and the to-be-built second field group; group the read data based on the to-be-built first field group and the to-be-built second field group, to form field group data; perform, on the field group data according to the execution operations, join operations that meet the execution conditions, to obtain a query result; map the query result to an output field sequence; and send the output field sequence; and memories of the n servers form a distributed storage system, configured to store the data corresponding to the fields.

In an implementation, after the reading the data of fields in the to-be-built first field group and the to-be-built second field group, the following is further included:

determining whether the execution conditions include a single table filtering condition; and if the execution conditions include the single table filtering condition, filtering the read data based on the single table filtering condition, where the grouping the read data based on the to-be-built first field group and the to-be-built second field group, to form field group data includes:

grouping filtered data based on the to-be-built first field group and the to-be-built second field group, to form the field group data.

In an implementation, the execution conditions include a theta join execution condition and an equal join execution condition; and the performing, on the field group data according to the execution operations, join operations that meet the execution conditions, to obtain a query result includes:

performing a theta join on the field group data according to the execution operations, to obtain an intermediate result that meets the theta join execution condition; and performing, according to the execution operations, an equal join on the intermediate result and field group data on which the theta join is not performed, to obtain a query result that meets the equal join execution condition.

In an implementation, after the grouping the read data based on the to-be-built field groups, to form field group data, the following is further included:

determining that the execution conditions include a primitive equal join execution condition, and performing an equal join on the field group data based on the primitive equal join execution condition and according to the execution operations, where the performing a join on the field group data according to the execution operations, to obtain a query result that meets the execution conditions includes:

performing, according to the execution operations, a join on the field group data on which the equal join is performed, to obtain the query result that meets the execution conditions.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

Figure 1:
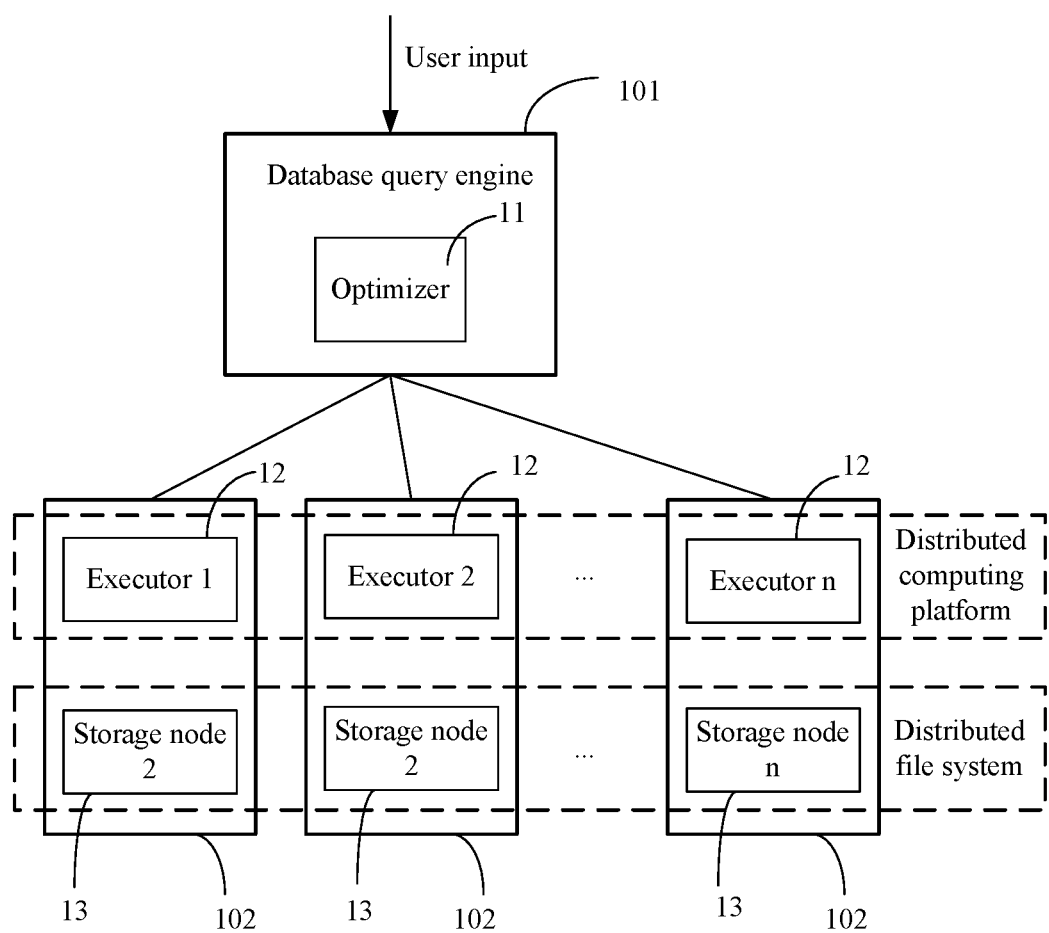
FIG. 1 is a schematic structural diagram of a database system of a distributed computing framework.

FIG. 1 is a database system of a distributed computing framework according to an embodiment of the present disclosure. The database system includes a database query engine 101 and n servers 102. The database query engine 101 includes an optimizer 11. Each server includes an executor 12 and a storage node 13. Executors in the n servers 102 form a distributed computing platform, and storage nodes in the n servers 102 form a distributed storage system.

Specifically, the database query engine 101 receives a query statement input by a user, the optimizer 11 parses the query statement, and generates an execution plan; and the database query engine 101 sends the execution plan to the n servers 102. The distributed computing platform formed by the executors in the n servers 102 receives the execution plan, and according to the execution plan, reads field data stored in the distributed storage system formed by the storage nodes in the n servers 102, processes the read field data, generates a query result, maps the query result to an output field sequence, and sends the output field sequence to the database query engine 101.

An objective of a control method for performing a multi-table join operation provided in the present disclosure is to resolve a prior-art problem of poor performance and large computing overheads, memory overheads, and inter-node network transmission overheads due to an explosively growing amount of data computation that is caused by calculation of a Cartesian product for all fields that are in tables and that are used in a query statement during a multi-table theta join operation.

Figure 2:
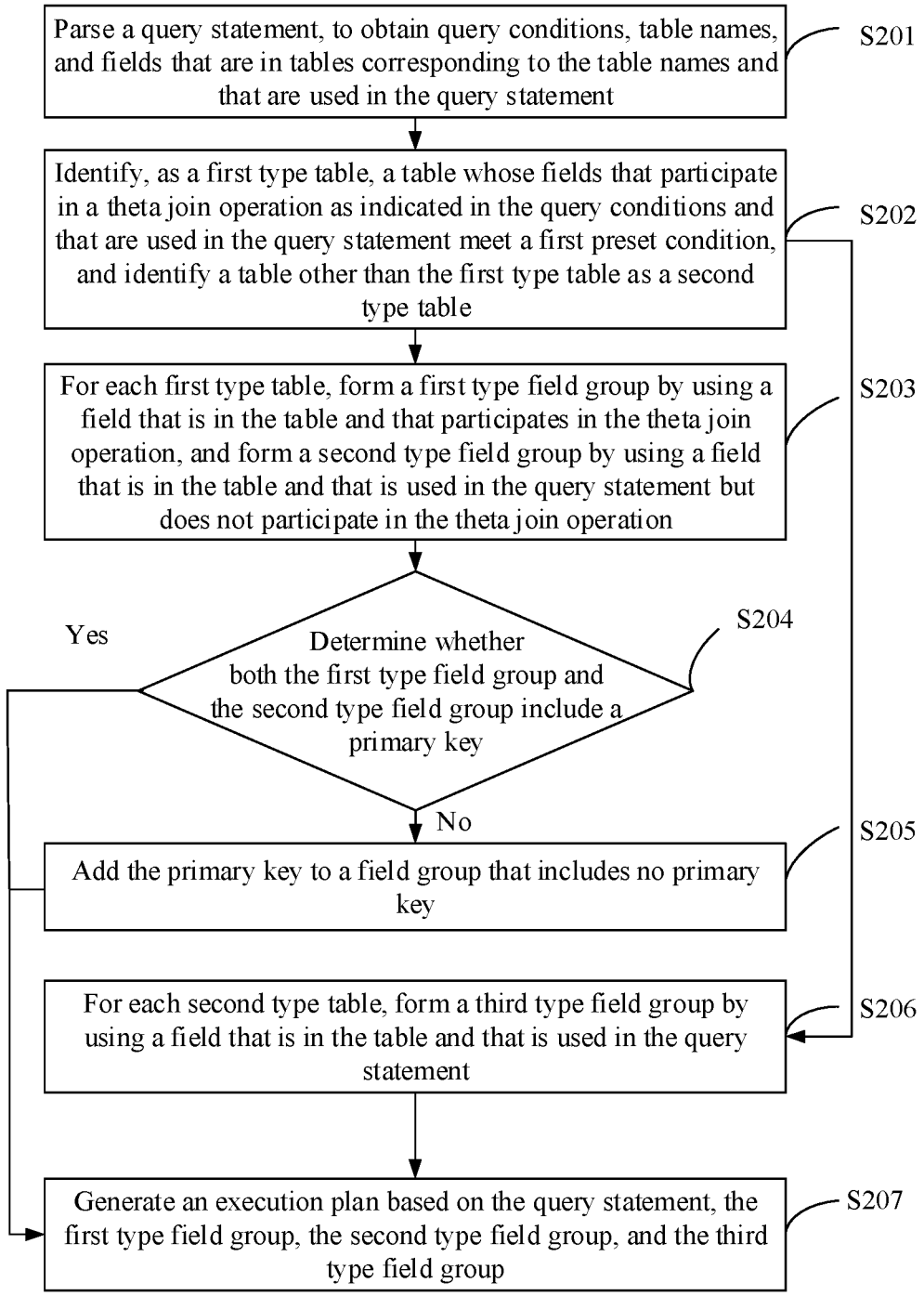
FIG. 2 is a flowchart of a control method for performing a multi-table join operation according to an embodiment of the present disclosure.

Referring to FIG. 1 and FIG. 2, a control method for performing a multi-table join operation disclosed in an embodiment of the present disclosure is applied to the optimizer 11. The control method includes the following operations.

Operation S201: Parse a query statement, to obtain query conditions, table names, and fields that are in tables corresponding to the table names and that are used in the query statement.

It should be noted that, when a user wants to perform a join operation on a plurality of stored tables, the user inputs a query statement to the database query engine 101. After receiving the query statement, the database query engine 101 forwards the query statement to the optimizer 11. The optimizer 11 receives the query statement, and parses the query statement, to obtain query conditions, table names, and fields that are in tables corresponding to the table names and that are used in the query statement, where the query conditions may include: a theta join condition, an equal join condition, and a single table filtering condition. The theta join condition represents performing a theta join operation on fields in two tables, the equal join condition represents performing an equal join operation on fields in two tables, and the single table filtering condition represents filtering data for a field in a table based on a filtering condition.

The following provides detailed description by using an example. In the example, a query statement input by the user is as follows:

Select c_custkey, c_name, c_nationkey, n_nationkey, n_regionkey, n_name, o_custkey, o_orderdate r_regionkey, r_name FROM customer, nation, orders, region where c_nationkey θ n_nationkey and c_custkey θ o_custkey and n_regionkey θ r_regionkey.

A primary key of a customer table is c_custkey, a primary key of a nation table is n_nationkey, and a primary key of a region table is r_regionkey.

Query conditions that are obtained through parsing by the optimizer 11 after the optimizer 11 receives the query statement includes:

theta join conditions: c_nationkey θ n_nationkey, c_custkey θ o_custkey, and n_regionkey θ r_regionkey.

Table names in the query statement include: customer, nation, orders, and region.

Fields that are in tables corresponding to the four table names and that are used in the query statement are as follows:

Fields in the customer table include: c_custkey, c_name, and c_nationkey; fields in the nation table include: n_nationkey, n_regionkey, and n_name; fields in an orders table include: o_custkey and o_orderdate; and fields in the region table include: r_regionkey and r_name.

It should be further noted that, in the foregoing example, θ represents a theta join, and may include a join operator such as >, ≥, <, and ≤. In this example, no specific operator is provided, and only θ is used in place. However, in an actual use process of the control method for performing a multi-table join operation disclosed in the present disclosure, θ in place of which operator needs to be specified in the query statement.

Operation S202: Identify, as a first type table, a table whose fields that participate in a theta join operation as indicated in the query conditions and that are used in the query statement meet a first preset condition, and identify a table other than the first type table as a second type table.

In this operation, it is determined whether fields that participate in a theta join operation and that are used in the query statement meet the first preset condition, to determine whether the tables corresponding to all the table names obtained in operation S201 are first type tables.

A setting principle of the first preset condition is: determining whether a Cartesian product calculation process causes a data computation amount to exceed a preset threshold when the theta join operation is performed on the fields in the table that are used in the query statement. It should be noted that if computation in a Cartesian product execution process causes the data computation amount to exceed the preset threshold when the theta join operation is performed on the fields in the table that are used in the query statement, it indicates that the data computation amount explosively grows. To resolve a problem of the severely expanding data computation amount, the table needs to be classified as a table that needs field decomposition.

It should be further noted that the first preset condition may be specifically: a quantity of fields in the table that are used in the query statement exceeds a first preset threshold; or storage overheads of the fields in the table that are used in the query statement exceed a first preset space threshold; or a quantity of fields in the table that are used in the query statement and that participate in the theta join operation exceeds a second preset threshold; or storage overheads of the fields in the table that are used in the query statement and that participate in the theta join operation exceed a second preset space threshold.

In the foregoing example, and that the first preset condition is that the storage overheads of the fields in the table that are used in the query statement exceed a preset space threshold is used as an example for description. In addition, storage overheads of three fields of c_custkey, c_name, and c_nationkey in the customer table and storage overheads of three fields of n_nationkey, n_regionkey, and n_name in the nation table are set to exceed the preset space threshold, and storage overheads of fields that are in the orders table and the region table and that are used in the query statement are set to not exceed the preset space threshold.

Then, in this example, it can be learned, based on the query conditions obtained in operation S201, that:

there is a c_custkey θ o_custkey join operation between the customer table and the orders table, and the storage overheads of the three fields of c_custkey, c_name, and c_nationkey in the customer table exceed the preset space threshold, and therefore the customer table is a first type table;

there is an n_regionkey θ r_regionkey join operation between the nation table and the region table, and the storage overheads of the three fields of n_nationkey, n_regionkey, and n_name in the nation table exceed the preset space threshold, and therefore the nation table is a first type table; and the orders table and the region table are second type tables.

It should be further noted that operation S203 is performed on the first type table identified in this operation; and operation S206 is performed on the second type table identified in this operation.

Operation S203: For each first type table, form a first type field group by using a field that is in the table and that participates in the theta join operation, and form a second type field group by using a field that is in the table and that is used in the query statement but does not participate in the theta join operation.

It should be noted that for a first type table whose fields in the table that are used in the query statement participate in the theta join operation and whose fields in the table that are used in the query statement meet the first preset condition, it indicates that a problem of the explosively growing amount of data computation in the Cartesian product execution process may occur when the theta join operation is performed on the fields in the table. Therefore, the fields in the first type table that are used in the query statement are decomposed, to obtain a plurality of field groups of each first type table, so that the theta join operation is performed in steps in a form of the plurality of field groups. This can reduce a data amount of Cartesian product calculation during one join operation, greatly reduce network transmission overheads, computing overheads, and memory overheads, and improve execution efficiency.

A manner of decomposing the fields in each first type table that are used in the query statement to obtain a plurality of first field groups of each first type table may be a manner in operation S203: forming the first type field group by using the field that is in the table and that participates in the theta join operation, and forming the second type field group by using the field that is in the table and that is used in the query statement but does not participate in the theta join operation; or may be another manner, provided that a quantity of fields that actually participate in the theta join operation can be reduced. For example, a field that participates in the theta join operation and some fields that do not participate in the theta join operation but are used in the query statement form a field group, and remaining fields form a field group. In addition, in this operation, the first type field group may be referred to as a first subtype field group, and the second type field group may be also referred to as a second subtype field group.

It should be further noted that, in this operation, the first type field group may be a field group formed by using all fields in the table that participate in the theta join operation; and the second type field group may be construed as a field group formed by using all fields in the table that are used in the query statement but do not participate in the theta join operation.

In one embodiment, a manner of forming the first type field group may alternatively be: forming a plurality of field groups by using the fields in the table that participate in the theta join operation.

Specifically, the fields in the first type table that participate in the theta join operation are decomposed according to a preset rule, to obtain a plurality of first type field groups. The preset rule is: A field for a theta join with a same table is decomposed as a field group, and a field shared by any two different field groups meets a third preset condition. In addition, for detailed content, refer to content of operation S409 in the following embodiment corresponding to FIG. 4B, and details are not described herein again.

In the foregoing example, a first type field group formed by decomposing the fields in the customer table is (c_custkey, c_nationkey), and a second type field group formed by decomposing the fields in the customer table is (c_name). A first type field group formed by decomposing the fields in the nation table is (n_regionkey, n_nationkey), and a second type field group formed by decomposing the fields in the nation table is (n_name).

Operation S204: Determine whether both the first type field group and the second type field group include a primary key.

If the first type field group or the second type field group includes no primary key, operations S205 and S207 are performed.

If both the first type field group and the second type field group include the primary key, operation S207 is performed.

Operations S205: Add the primary key to a field group that includes no primary key.

The primary key is a non-null field. If the first type field group or the second type field group includes no primary key, the primary key needs to be added, for a purpose that an equal join may be performed, by using the primary key, on results that are obtained through theta join operations on the first type field group and the second type field group, to obtain an entire query result. In addition, for a field group including no primary key in the first type field group and the second type field group, a primary key of a table to which the field group belongs needs to be added.

It should be further noted that operations S203 to S205 are an implementation of forming the first type field group by using the primary key and the field that is in each first type table and that participates in the theta join operation and forming the second type field group by using the primary key and the field that is in each first type table and that is used in the query statement but does not participate in the theta join operation. Alternatively, there may be another implementation, and details are not described herein.

In the foregoing example, both the first type field groups (c_custkey, c_nationkey) and (n_regionkey, n_nationkey) include the primary key, neither the second type field group (c_name) nor the second type field group (n_name) includes a primary key, and a field group (c_name, c_custkey) and a field group (n_name, n_nationkey) are formed after the primary keys are added to the second type field groups.

Operation S206: For each second type table, form a field group by using a field that is in the table and that is used in the query statement, where the formed field group may be referred to as a third type field group (may also be referred to as a second field group).

In the foregoing example, the orders table and the region table are tables, other than the first type tables, of obtained tables. A third type field group formed by using fields in the orders table that are used in the query statement is (o_custkey, o_orderdate), and a third type field group formed by using fields in the region table that are used in the query statement is (r_regionkey, r_name).

Operation S207: Generate an execution plan based on the query statement, the first type field group, the second type field group, and the third type field group.

The execution plan includes a to-be-built first type field group, a to-be-built second type field group, a to-be-built third type field group, execution operations, and execution conditions. The generated execution plan is used to control to read data corresponding to fields in the first type field group, the second type field group, and the third type field group, and perform, on the read data according to the execution operations, join operations that meet the execution conditions, to obtain a query result that meets a requirement of the query statement.

It should be further noted that the execution conditions include a theta join execution condition and an equal join execution condition, and the equal join execution condition further includes a primitive equal join execution condition and a derived equal join execution condition. The theta join execution condition is the same as the theta join condition in the query statement; the primitive equal join execution condition is the same as the equal join condition in the query statement. The derived equal join execution condition is usually used to perform, by using a primary key of a first type table as an equal join parameter, an equal join on intermediate results that are generated by executing the query conditions on the first type field group and the second type field group obtained by decomposing the first type table.

Therefore, in operation S207, an implementation of generating the execution plan based on the query statement, the first type field group, the second type field group, and the third type field group may include:
using the first type field group, the second type field group, and the third type field group as to-be-built field groups included in the execution plan;
generating a theta join execution condition and a primitive equal join execution condition of the execution conditions based on the query conditions in the query statement;
to meet the requirement of the query result corresponding to the query statement, using, as a derived equal join execution condition of the execution conditions, a condition for performing, by using a primary key of a first type table as an equal join parameter, an equal join on intermediate results that are generated by executing the query conditions on the first type field group and the second type field group; and
to meet the requirement of the query result corresponding to the query statement, using an execution sequence of the execution conditions as the execution operations.

Figure 3A:
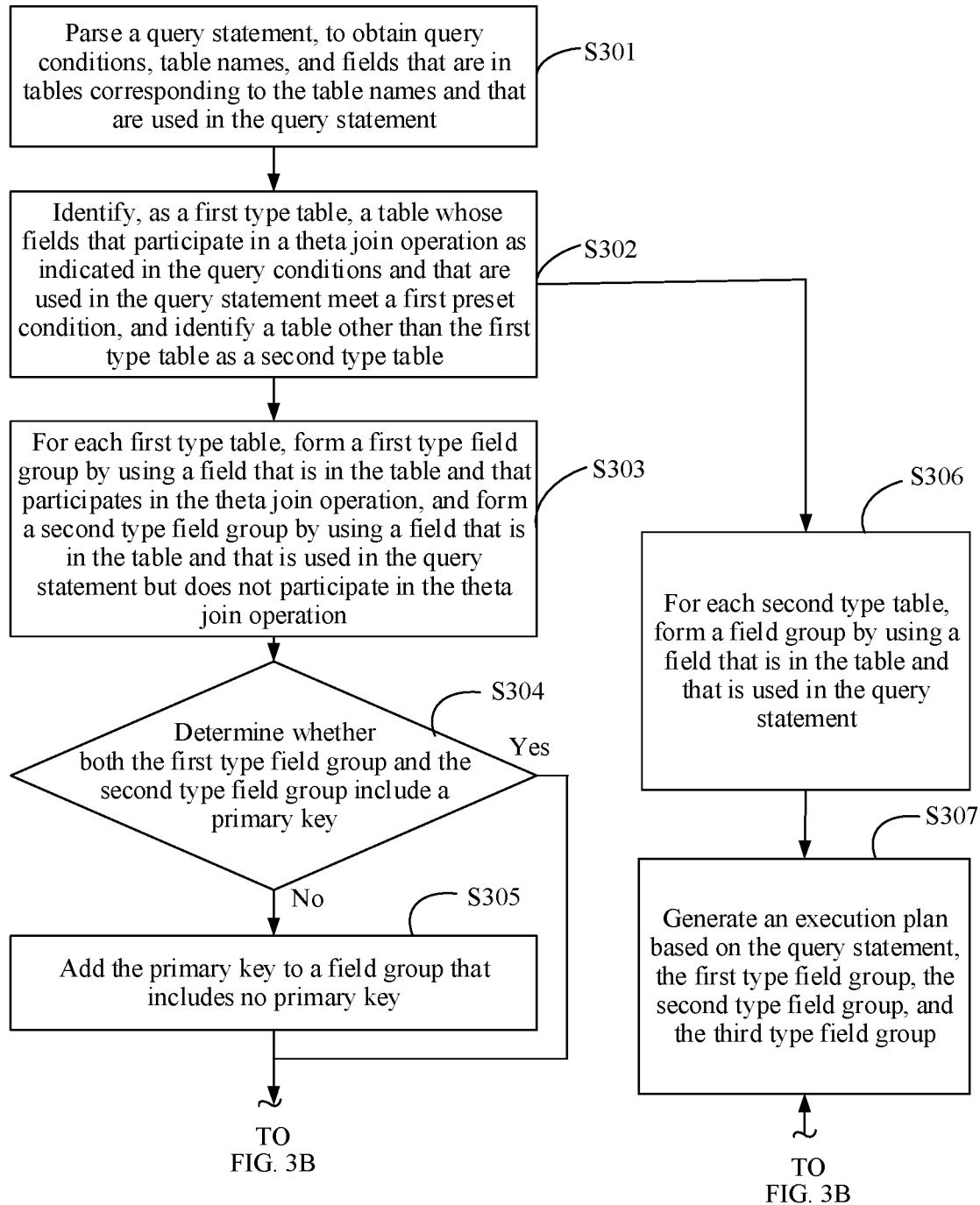
FIG. 3A and FIG. 3B are a flowchart of a control method for performing a multi-table join operation according to another embodiment of the present disclosure.

In one embodiment, referring to FIG. 3A, a control method for performing a multi-table join operation disclosed in another embodiment of the present disclosure includes operations S301 to S307. For content of operations S301 to S307, refer to operations S201 to S207 in the embodiment corresponding to FIG. 2, and details are not described herein again.

In addition, in this embodiment, after operation S305 and after operation S304 with a determining result being that both a first type field group and a second type field group include a primary key, the method further includes:

Operation S308: Determine whether fields in the first type field group meet a second preset condition.

It should be noted that whether fields in a first type field group of each first type table meet the second preset condition needs to be determined.

A setting principle of the second preset condition is the same as that of the first preset condition, and the second preset condition is also used to determine whether a Cartesian product calculation process causes a data computation amount to exceed a preset threshold when a theta join operation is performed on the fields in the first type field group. Therefore, the second preset condition may also be set from perspectives of a field quantity and field storage overheads. For example, a quantity of fields in the first type field group exceeds a third preset threshold, or storage overheads of the fields in the first type field group exceed a third preset space threshold. Certainly, in the specified second preset condition, the third preset threshold corresponding to the field quantity and the third preset space threshold corresponding to the field storage overheads may be the same as those in the first preset condition, or may be less than values in the first preset condition.

If it is determined that the fields in the first type field group do not meet the second preset condition, operation S307 is performed.

If the fields in the first type field group of each first type table do not meet the second preset condition, it indicates that first type field groups of all first type tables do not need to be further decomposed, and operation S307 may be directly performed.

If it is determined that fields in a first type field group of a first type table meet the second preset condition, operation S309 is performed: Decompose the first type field group that meets the second preset condition, to obtain a plurality of field groups.

When it is determined that the fields in the first type field group meet the second preset condition, it indicates that a problem of an explosively growing amount of data computation in a Cartesian product execution process still occurs when the theta join operation is performed on the fields in the first type field group. Therefore, the fields in the first type field group are decomposed, to obtain the plurality of field groups, so that a quantity of fields that participate in the theta join operation is further reduced, and the data computation amount in the Cartesian product execution process is reduced.

It should be further noted that, in operation S309, the fields in the first type field group may be decomposed in a plurality of manners. For example, an equalization manner is used, that is, the fields in the first type field group are equally divided, to form the plurality of field groups; or a manner of forming a field group by using a field with a large storage overhead and a field with a small storage overhead may be used; or the fields in the first type field group may be even randomly decomposed.

In addition, the decomposing the fields in the first type field group may be construed as one decomposition, namely, only one decomposition is performed, to form two field groups; or may be construed as a plurality of decompositions, where a quantity of the plurality of decompositions may be set as a condition for stopping decomposition, or after one decomposition, operations S308 and S309 are performed for field groups obtained through decomposition, until a field in a decomposed field group does not meet the second preset condition.

It should be further noted that in an execution process of operation S309, if a plurality of fields in the first type field group participate in a same theta join operation, such fields are not decomposed. For example, in a theta join operation t1.a1+t1.a2>t2.b, a field a1 and a field a2 of a table t1 participate in the same theta join operation t1.a1+t1.a2>t2.b. In this case, the field a1 and the field a2 of the table t1 are not decomposed.

Operation S310: Determine whether all the field groups obtained through decomposition include a primary key.

If a field group in the field groups obtained through decomposition includes no primary key, operation S311 is performed: Add the primary key to the field group that includes no primary key.

It should be noted that if a field group in the field groups obtained through decomposition includes no primary key, a primary key of a table to which the field group belongs needs to be added to the field group. In addition, a purpose of adding the primary key to the field group that includes no primary key is the same as that in operation S205 of the foregoing embodiment, and details are not described herein again.

If all the field groups obtained through decomposition include the primary key, operation S307 is performed.

It should be further noted that if operation S307 is performed after operations S310 and S311, operation S307 is specifically: generating an execution plan based on a query statement, the field groups obtained by decomposing the first type field group, the second type field group, and a third type field group.

Figure 4A:
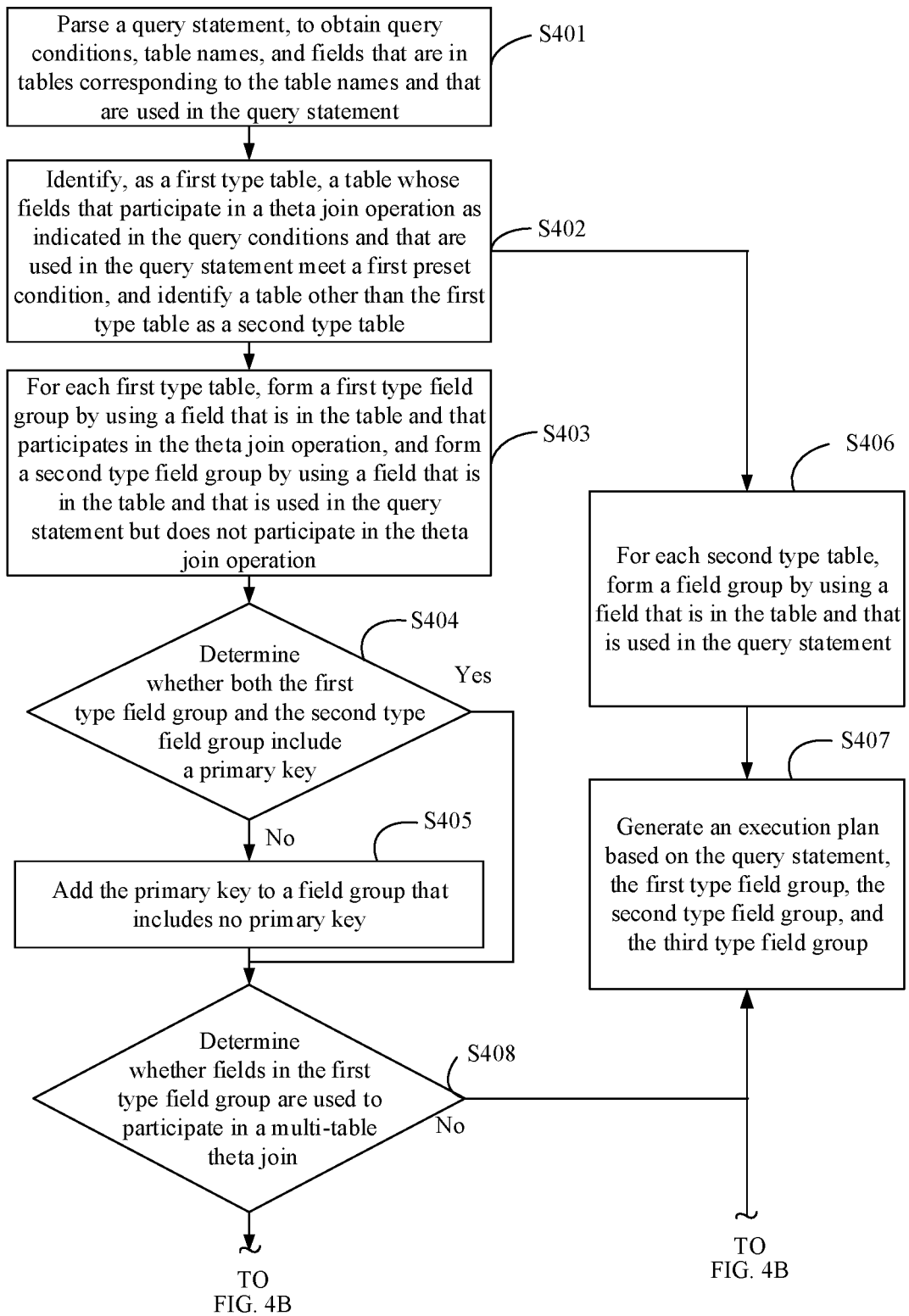
FIG. 4A and FIG. 4B are a flowchart of a control method for performing a multi-table join operation according to another embodiment of the present disclosure.

In one embodiment, referring to FIG. 4A, a control method for performing a multi-table join operation disclosed in another embodiment of the present disclosure includes operations S401 to S407. For content of operations S401 to S407, refer to operations S201 to S207 in the embodiment corresponding to FIG. 2, and details are not described herein again.

In this embodiment, after operation S405 and after operation S404 with a determining result being that both a first type field group and a second type field group include a primary key, the method further includes:

Operation S408: Determine whether fields in the first type field group are used to participate in a multi-table theta join.

It should be noted that for a first type field group of each first type table obtained through decomposition, whether fields in the field group are used to participate in a multi-table theta join needs to be determined.

If it is determined that the fields in the first type field group are not used to participate in the multi-table theta join, operation S407 is performed.

If first type field groups of all first type tables are not used to participate in the multi-table theta join, it indicates that a probability of a problem of an explosively growing amount of data computation in a Cartesian product execution process when a theta join operation is performed on fields in the first type field groups is relatively low. Therefore, operation S407 may be performed.

If it is determined that fields in a first type field group of a first type table are used to participate in the multi-table theta join, operation S409 is performed.

Operation S409: Decompose the first type field group according to a preset rule, to obtain a plurality of field groups.

It should be noted that if a first type field group of a first type table is used to participate in the multi-table theta join, it indicates that fields in the first type field group may be further decomposed, to further reduce a quantity of fields that participate in the theta join operation.

The preset rule for decomposing the first type field group is that a field used to perform a theta join with a same table is decomposed as a field group, and a field shared by any two different field groups meets a third preset condition. The third preset condition is used to determine a correlation between two field groups obtained through decomposition. If the correlation between the two field groups is relatively high, the two field groups should not be decomposed, and should be combined into one field group. If the correlation between the two field groups is relatively low, it indicates that mutual influence between the two field groups is relatively small, and the two field groups may be two independent field groups for theta join execution. A field shared by the two field groups is used to determine the correlation the two field groups. A smaller quantity of shared fields or a smaller space overhead occupied by the shared field indicates a lower correlation the two field groups. Therefore, the third preset condition may be that a percentage of a quantity of shared fields in a quantity of all fields in the two field groups is less than a specified value, or may be that a percentage of space overheads of the shared fields in space overheads of all fields in the two field groups is less than a specified value. It should be further noted that all the fields in the two field groups do not include a repeated field.

For example, a field a1, a field a2, and a field a3 in a table t1 are in a theta join with a field in a table t2, and the field a1, the field a2, a field a4, and a field a5 in the table t1 are in a theta join with a field in a table t3.

The field a1, the field a2, the field a3, the field a4, and the field a5 in the table t1 form a first type field group. Only when shared fields a1 and a2 meet the third preset condition, the first type field group formed by the field a1, the field a2, the field a3, the field a4, and the field a5 is decomposed, to obtain a field group formed by the field a1, the field a2, and the field a3 and a field group formed by the field a1, the field a2, the field a4, and the field a5.

In the foregoing example, in a first type field group (c_custkey, c_nationkey), c_custkey is used to perform a theta join with a field o_custkey in an orders table, and c_nationkey is used to perform a theta join with a field n_nationkey in a nation table. Therefore, the first type field group (c_custkey, c_nationkey) meets operation S408, and needs to be decomposed, and field groups obtained through decomposition are (c_custkey) and (c_nationkey).

Operation S410: Determine whether all the field groups obtained through decomposition include a primary key.

If a field group includes no primary key, operation S411 is performed: Add the primary key to the field group.

It should be noted that if a field group in the field groups obtained through decomposition includes no primary key, a primary key of a table to which the field group belongs needs to be added to the field group. In addition, a purpose of adding the primary key to the field group that includes no primary key is the same as that in operation S205 of the foregoing embodiment, and details are not described herein again.

In the foregoing example, the field group (c_nationkey) obtained by decomposing the first type field group (c_custkey, c_nationkey) in operation S409 includes no primary key, and the primary key is added to the field group (c_nationkey), to form a field group (c_nationkey, c_custkey).

If all the field groups obtained through decomposition include the primary key, operation S407 is performed.

It should be further noted that if operation S407 is performed after operations S410 and S411, operation S407 of generating an execution plan based on a query statement, the first type field group, the second type field group, and a third type field group is specifically: generating the execution plan based on the query statement, the field groups obtained by decomposing the first type field group, the second type field group, and the third type field group.

Figure 3B:
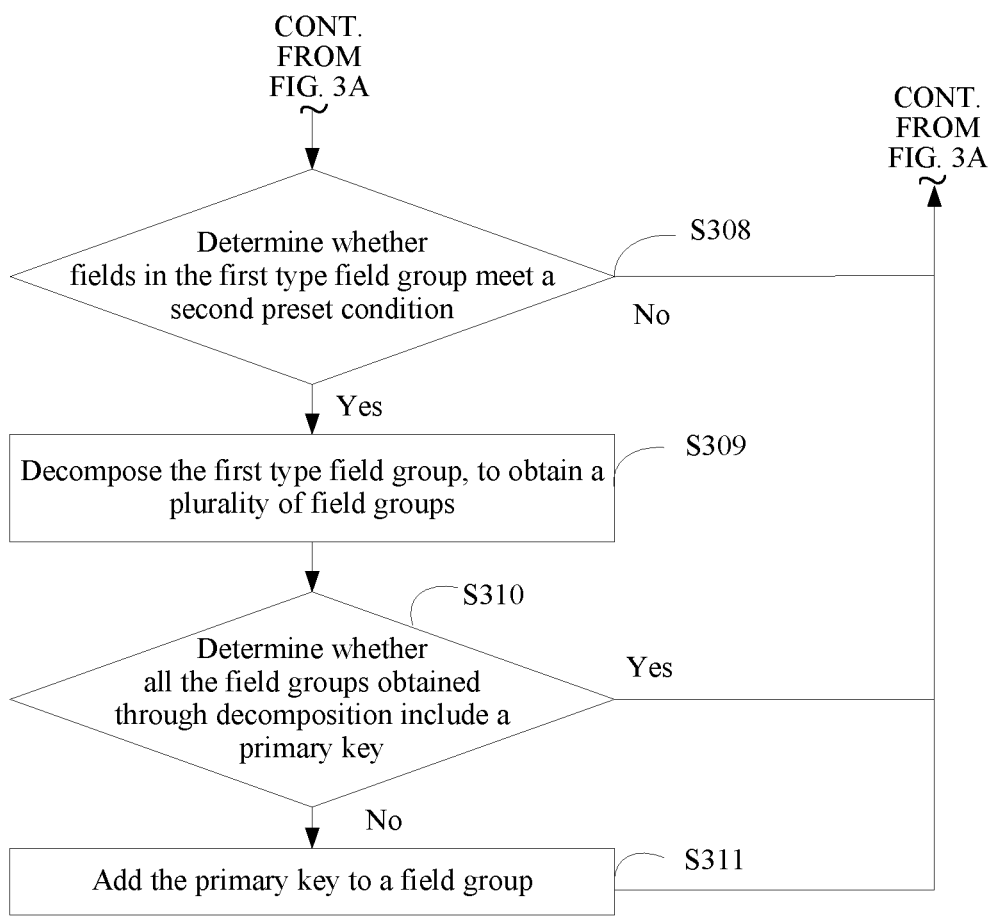

In one embodiment, referring to FIG. 3B and FIG. 4A, operations S308 to S311 in FIG. 3B may be further performed before operation S408 in FIG. 4A. To be specific, before a manner of determining whether fields participate in a multi-table theta join is used to determine whether to decompose the first type field group, a manner of determining whether fields meet a second preset condition may be first used to determine whether to decompose the first type field group.

Alternatively, operations S308 to S311 in FIG. 3B may be further performed before S407. To be specific, the manner of determining whether the fields meet the second preset condition is first used to determine whether to decompose the first type field group, and then the manner of determining whether the fields participate in the multi-table theta join is used to determine whether to decompose the first type field group.

For specific content of operations S308 to S311, refer to content of the embodiment corresponding to FIG. 3B, and details are not described herein again.

Figure 5:
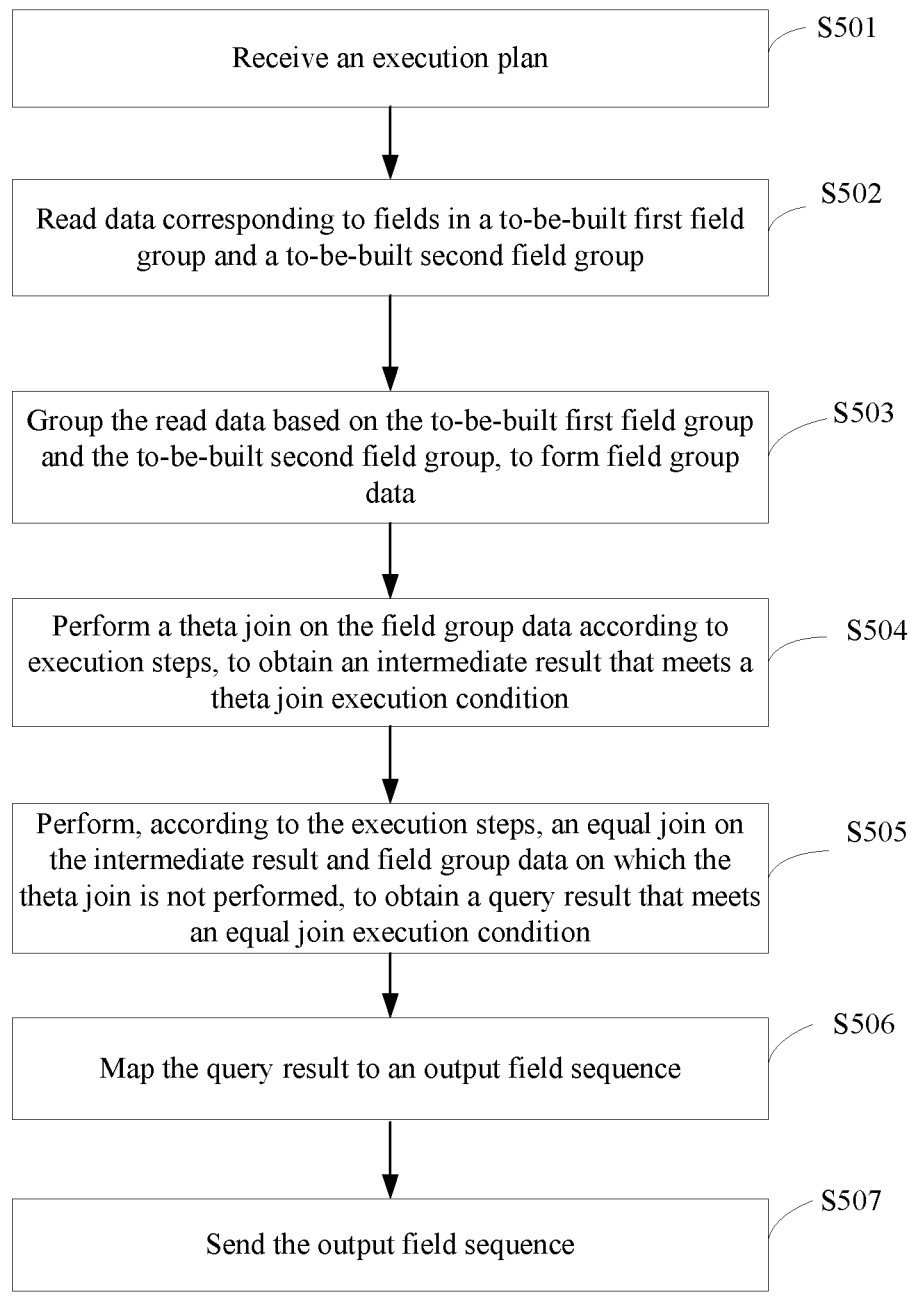
FIG. 5 is a flowchart of a control method for performing a multi-table join according to another embodiment of the present disclosure.

Referring to FIG. 1 and FIG. 5, another embodiment of the present disclosure further discloses a control method for performing a multi-table join, applied to a server cluster that includes n servers, where n is greater than or equal to 1. The control method disclosed in this embodiment includes the following operations.

Operation S501: Receive an execution plan.

The execution plan includes a to-be-built first field group, a to-be-built second field group, execution operations, and execution conditions. The execution conditions include a theta join execution condition and an equal join execution condition. For the execution operations and a requirement of the execution conditions, refer to content of operation S207 in the embodiment corresponding to FIG. 2, and details are not described herein again.

Figure 4B:
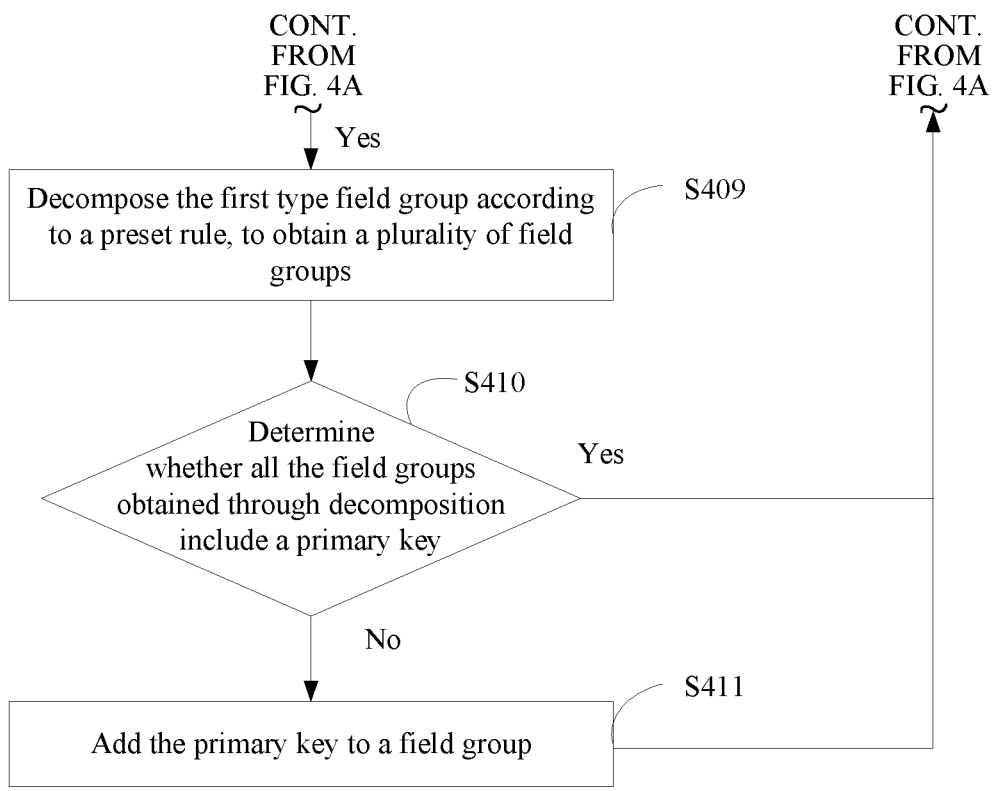

It should be further noted that the first field group in the execution plan may be the first type field group and the second type field group in operation S203 in the foregoing method embodiment corresponding to FIG. 2; or may be the plurality of field groups obtained through decomposition in operation S309 in the manner embodiment corresponding to FIG. 3B; or may be the plurality of field groups obtained through decomposition in operation S409 in the manner embodiment corresponding to FIG. 4B. In addition, the second field group in the execution plan is the third type field group in operation S206 in the foregoing method embodiment corresponding to FIG. 2.

Operation S502: Read data corresponding to fields in a to-be-built first field group and a to-be-built second field group.

Specifically, the data corresponding to the fields in the to-be-built first field group and the to-be-built second field group may be stored in n storage nodes in the n servers, a distributed computing platform including executors in the n servers 102 receives the execution plan, and reads, from a distributed storage system including the n storage nodes, the data corresponding to the fields in the to-be-built field groups.

Operation S503: Group the read data based on the to-be-built first field group and the to-be-built second field group, to form field group data.

The to-be-built field groups are field groups obtained by an optimizer 11. After the data corresponding to the fields that form the field group is read, the read data is combined in a field group display manner, to form the field group data.

Figure 6:
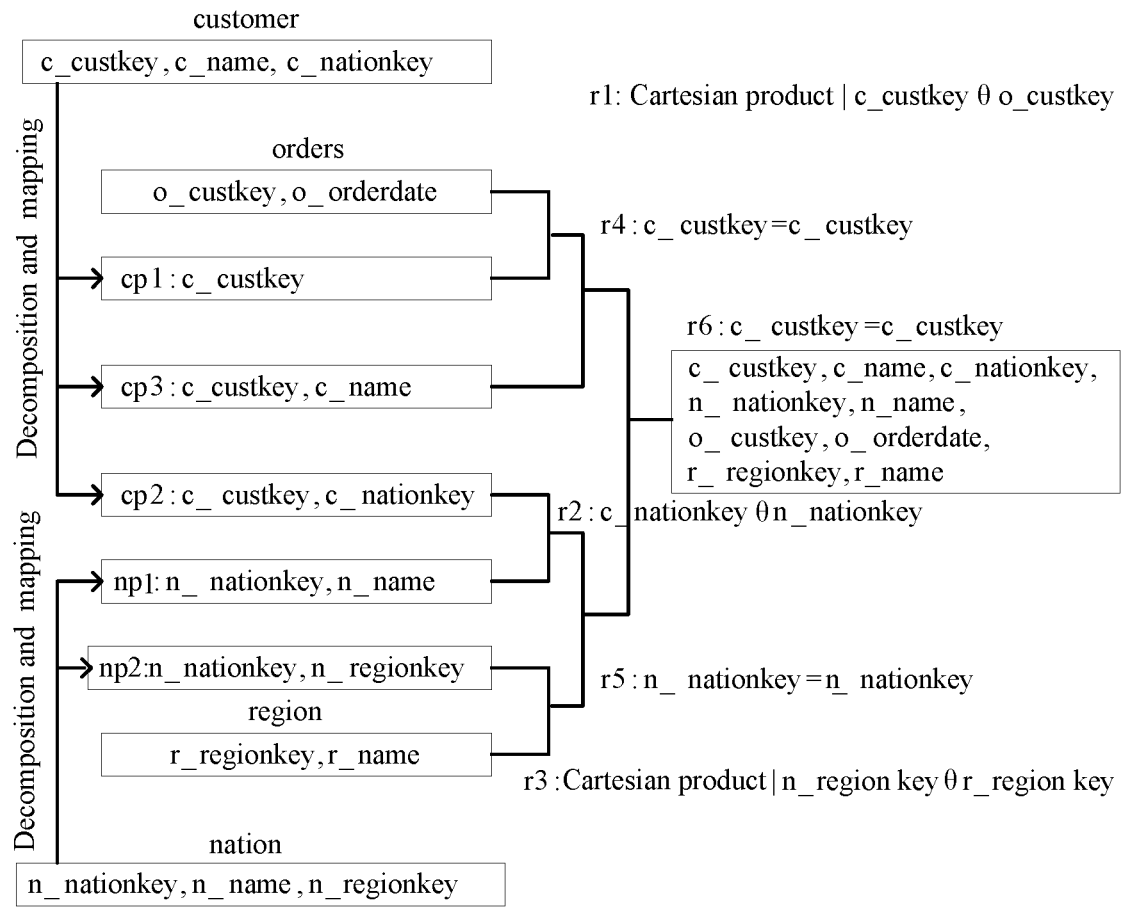
FIG. 6 is a display diagram of executing execution conditions on field groups according to another embodiment of the present disclosure.

Referring to FIG. 6, in the foregoing example, data of three fields c_custkey, c_name, and c_nationkey in a customer table is combined to form the following field group data:
cp1: c_custkey,
cp2: c_custkey, c_nationkey,
cp3: c_custkey, c_name;
data of three fields n_nationkey, n_regionkey, and n_name in a nation table is combined to form the following field group data:
np1: n_nationkey, n_name,
np2: n_nationkey, n_regionkey;
data in fields o_custkey and o_orderdate in an orders table form field group data: o_custkey, o_orderdate; and
data in fields r_regionkey and r_name in a region table form field group data: r_regionkey, r_name.

Operation S504: Perform a theta join on the field group data according to execution operations, to obtain an intermediate result that meets a theta join execution condition.

Referring to FIG. 6, for a theta join condition c_custkey θ o_custkey, a Cartesian product is calculated based on cp1: c_custkey and the field group: o_custkey, o_orderdate, to obtain data r1 that meets the join condition c_custkey θ o_custkey. For a theta join condition c_nationkey θ n_nationkey, a Cartesian product is calculated based on the field group cp2: c_custkey, c_nationkey and np1: n_nationkey, n_name, to obtain data r2 that meets c_nationkey θ n_nationkey. For a theta join condition n_regionkey θ r_regionkey, a Cartesian product is calculated based on the field group np2: n_nationkey, n_regionkey and the field group: r_regionkey, r_name, to obtain data r3 that meets the join condition n_regionkey θ r_regionkey.

Operation S505: Perform, according to the execution operations, an equal join on the intermediate result and field group data on which the theta join is not performed, to obtain a query result that meets an equal join execution condition.

It should be noted that the intermediate result obtained in operation S504 is also a field group carrying data. During an equal join operation, a primary key field shared by field groups is used as an equal join parameter.

In the example of the present disclosure, referring to FIG. 6, a primary key c_custkey is used as a join condition of an equal join, to perform the equal join on r1 and cp3: c_custkey, c_name, to obtain r4; a primary key n_nationkey is used as a join condition of an equal join, to perform the equal join on r2 and r3, to obtain r5; and finally, the primary key c_custkey is used as a join condition of an equal join, to perform the equal join on r4 and r5, to obtain r6.

It should be further noted that the equal join execution condition may include a primitive equal join execution condition and a derived equal join execution condition. The primitive equal join execution condition is an execution condition that is formed based on an equal join between fields included in the query condition in the query statement, and the derived equal join execution condition is an execution condition of a common primary key field-based equal join that is performed to obtain the query result.

If the equal join execution condition includes the primitive equal join execution condition, this operation may be: first performing, based on the primitive equal join execution condition, an equal join on field group data on which the theta join is not performed and that is used in the primitive equal join; and then performing a common primary key field-based equal join on field group data on which the primitive equal join has been performed, field group data on which the theta join is not performed and that is not used in the primitive equal join, and the intermediate result, to obtain the query result.

If the equal join execution condition does not include the primitive equal join execution condition, this operation is: performing a common primary key field-based equal join on the intermediate result and field group data on which the theta join is not performed, to obtain the query result.

Operation S506: Map the query result to an output field sequence.

Specifically, in the example of the present disclosure, the obtained r6 is mapped to an output field sequence.

Operation S507: Send the output field sequence.

Specifically, after the output field sequence is obtained, the output field sequence is sent to a database query engine 101.

It should be noted that forms of the to-be-built first field group, the to-be-built second field group, and the execution conditions in operation S501, and field group data processing manners disclosed in operations S504 and S505 are merely an implementation of filtering the field group data to obtain the query result that meets the execution conditions. It can be determined that for another implementation of the to-be-built field groups and the execution conditions, if fields on which the theta join operation is performed are decomposed into a plurality of field groups, to implement the join operation in steps in a form of the plurality of field groups, compared with the prior art, this can reduce a data amount of Cartesian product calculation during one join operation, greatly reduce network transmission overheads, computing overheads, and memory overheads, and improve execution efficiency. Such implementations may all fall within the protection scope of the solutions of the present disclosure.

In another embodiment of the present disclosure, after operation S502, the method further includes:
determining whether the execution conditions include a single table filtering condition; and
if it is determined that the execution conditions include the single table filtering condition, filtering the read data based on the single table filtering condition.

In this case, operation S503 of grouping the read data based on the to-be-built field groups, to form field group data includes:
grouping filtered data based on the to-be-built field groups, to form the field group data.

If it is determined that a filtering condition does not include the single table filtering condition, operation S503 is performed.

In the query statement parsed by the optimizer, if the query conditions include the single table filtering condition, the execution conditions in the generated execution plan include the single table filtering condition. Therefore, this condition needs to be used as a filtering condition, to delete data that is read in operation S502 but does not meet the filtering condition.

In another embodiment of the present disclosure, after operation S503, the method further includes:
determining whether the execution conditions include a field equal join execution condition; and
if the execution conditions include a primitive equal join execution condition, performing an equal join on the field group data based on the primitive equal join execution condition and according to the execution operations.

It can be understood that if the execution conditions include the primitive equal join execution condition, the execution operation should further include an operation of executing a primitive equal join. In addition, in this case, operation S504 is: performing, according to the execution operations, a join on the field group data on which the equal join is performed, to obtain an intermediate result that meets the execution conditions.

If the execution conditions do not include the primitive equal join execution condition, operation S504 is directly performed.

It should be further noted that, in this embodiment, operation S505 may be construed as: performing, according to the execution operations, a common primary key field-based equal join on the intermediate result and the field group data on which the theta join is not performed and that is not used in the primitive equal join, to obtain the query result.

The following describes the control method for performing a multi-table join disclosed in the present disclosure by using a query statement of "Select c_custkey, c_name, c_nationkey, n_nationkey, n_name, o_custkey, o_orderdate FROM customer, nation, orders where c_nationkey>n_nationkey and c_custkey>o_custkey and c_custkey<n" as an example.

The foregoing query statement includes two theta join conditions ">" and one single table filtering condition "c_custkey<n". As shown in the following table, when a single table filtering threshold n is set to 5, 10, and 15, a query result may be returned in 6 to 7 seconds if the control method for performing a multi-table join of the present disclosure is used, and a query result can be returned in 147 to 524 seconds if the method disclosed in the present disclosure is not used. A maximum acceleration ratio of the method of the present disclosure can reach up to 87.3 times.

| Filtering condition | Execution time (second) after optimization of decomposition and mapping | Spark SQL execution time (second) |
| --- | --- | --- |
| n = 5 | 7 | 147 |
| n = 10 | 6 | 365 |
| n = 15 | 6 | 524 |

Figure 7:
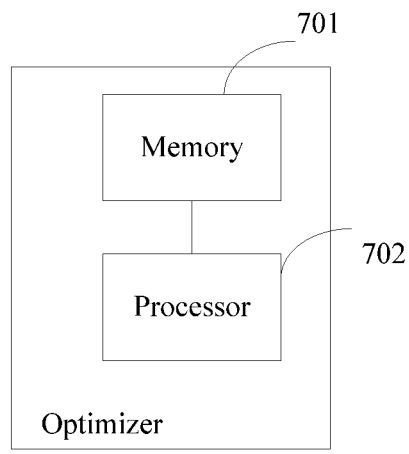
FIG. 7 is a schematic structural diagram of an optimizer according to another embodiment of the present disclosure.

Referring to FIG. 7, another embodiment of the present disclosure further discloses an optimizer, including:
a memory 701, configured to store a program and data generated during program running; and
a processor 702, configured to run the program in the memory 701, to implement the following functions:
parsing a query statement, to obtain query conditions, table names, and fields that are in tables corresponding to the table names and that are used in the query statement;
decomposing fields in each first type table that are used in the query statement, to obtain a plurality of first field groups of each first type table; obtaining a second field group of each second type table in a manner of forming one second field group by using a field that is in each second type table and that is used in the query statement; and generating an execution plan based on the query statement, the first field groups, and the second field group.

A table whose fields that participate in a theta join operation as indicated in the query conditions and that are used in the query statement meet a first preset condition is a first type table; the first preset condition is used to indicate that a data computation amount exceeds a preset threshold due to Cartesian product calculation when the theta join operation is performed on the fields in the table that are used in the query statement; the second type table is a table, other than the first type table, in the tables corresponding to the table names; and the execution plan is used to control to read data corresponding to fields in the first field groups and the second field group, and perform, on the read data according to execution steps, a join operation that meets an execution condition, to obtain a query result that meets a requirement of a query statement.

In another embodiment of the present disclosure, based on usage of the first preset condition, the specified first preset condition may include:

a quantity of fields in the table that are used in the query statement exceeds a first preset threshold;

storage overheads of the fields in the table that are used in the query statement exceed a first preset space threshold;

a quantity of fields in the table that are used in the query statement and that participate in the theta join operation exceeds a second preset threshold; or storage overheads of fields in the table that are used in the query statement and that participate in the theta join operation exceed a second preset space threshold.

In another embodiment of the present disclosure, when decomposing the fields in each first type table that are used in the query statement, to obtain the plurality of first field groups of each first type table, the processor 702 is specifically configured to:

for each first type table, separately form a first subtype field group by using a primary key and a field that is in the table and that participates in the theta join operation, and form a second subtype field group by using the primary key and a field that is in the table and that is used in the query statement but does not participate in the theta join operation, where when generating the execution plan based on the query statement, the first field groups, and the second field group, the processor 702 is specifically configured to:

generate the execution plan based on the query statement, the first subtype field group, the second subtype field group, and the second field group, where the execution plan is used to control to read data corresponding to fields in the first subtype field group, the second subtype field group, and the second field group, and perform, on the read data according to the execution operations, the join operations that meet the execution conditions, to obtain the query result that meets the requirement of the query statement.

In another embodiment of the present disclosure, when performing the operation of forming a first subtype field group by using a primary key and a field that is in the table and that participates in the theta join operation, the processor 702 is specifically configured to:

form one first subtype field group by using the primary key and all fields in the table that participate in the theta join operation;

or is specifically configured to: form one first subtype field group by using the primary key and a field that is in the table and that is used to perform a theta join operation with a field in a same table.

It should be noted that for a specific working process of the processor 702 in the foregoing embodiment, reference may be made to content in the method example corresponding to FIG. 2, and details are not described herein again.

In another embodiment of the present disclosure, before generating the execution plan based on the query statement, the first subtype field group, the second subtype field group, and the second field group, the processor 702 is further configured to:

if it is determined that fields in a first subtype field group of a specific first type table meet a second preset condition, decompose the first subtype field group, to obtain a plurality of field groups; determine whether all the plurality of field groups obtained by decomposing the first subtype field group that meets the second preset condition include the primary key; and if not all the plurality of field groups obtained by decomposing the first subtype field group that meets the second preset condition include the primary key, add the primary key to a field group that includes no primary key.

The processor 702 is further configured to: after adding the primary key to the field group that includes no primary key, and after determining that all the plurality of field groups obtained by decomposing the first subtype field group that meets the second preset condition include the primary key, perform the operation of generating the execution plan based on the query statement, the first subtype field group, the second subtype field group, and the second field group.

In one embodiment, the foregoing second preset condition includes:

a quantity of fields in the first subtype field group exceeds a third preset threshold; or storage overheads of the fields in the first subtype field group exceed a third preset space threshold.

For a specific working process of the processor 702 in this embodiment, refer to content in operations S308 to S311 in the embodiment corresponding to FIG. 3B, and details are not described herein again.

In another embodiment of the present disclosure, after forming the first subtype field group and the second subtype field group, the processor 702 is further configured to:

if it is determined that fields in a first type field group of one first type table are used to participate in a multi-table theta join operation, decompose the first subtype field group according to a preset rule, to obtain a plurality of field groups; determine whether all the plurality of field groups obtained through decomposition include the primary key; and if not all the plurality of field groups obtained through decomposition include the primary key, add the primary key to a field group that includes no primary key.

The foregoing preset rule includes: a field that is in the first subtype field group and that is used to perform a theta join with a same table is decomposed as a field group, and a field shared by any two field groups obtained through decomposition meets a third preset condition, where the third preset condition is used to determine a correlation between two field groups formed through decomposition.

The processor 702 is further configured to: after adding the primary key to the field group that includes no primary key, and after determining that all the plurality of field groups obtained through decomposition include the primary key, perform the operation of generating the execution plan based on the query statement, the first subtype field group, the second subtype field group, and the second field group.

For a specific working process of the processor 702 in this embodiment, refer to content in operations S408 to S411 in the embodiment corresponding to FIG. 4A and FIG. 4B, and details are not described herein again.

Figure 8:
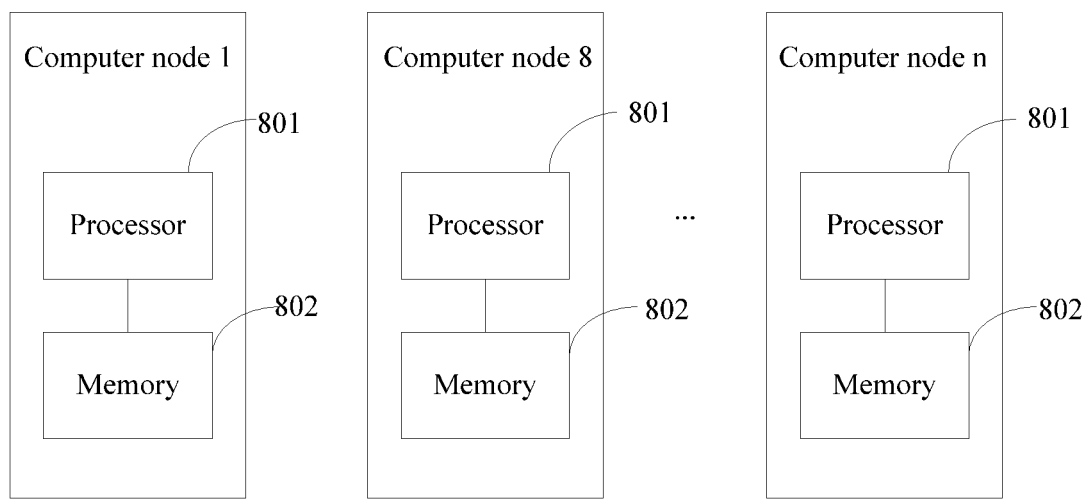
FIG. 8 is a schematic structural diagram of a server cluster according to another embodiment of the present disclosure.

Referring to FIG. 8, the present disclosure further discloses a server cluster, including n servers, where n is greater than or equal to 1, and each server includes a processor 801 and a memory 802.

Processors 801 of the n servers form a distributed computing platform, configured to receive an execution plan, where the execution plan includes a to-be-built first field group, a to-be-built second field group, execution operations, and execution conditions; read data corresponding to fields in the to-be-built first field group and the to-be-built second field group; group the read data based on the to-bebuilt first field group and the to-be-built second field group, to form field group data; perform, on the field group data according to the execution operations, join operations that meet the execution conditions, to obtain a query result; map the query result to an output field sequence; and send the output field sequence.

Memories 802 of the n servers form a distributed storage system, configured to store the data corresponding to the fields.

The processor 801 may be construed as an executor in each server, and the memory 802 may be construed as a storage node in each server.

In another embodiment of the present disclosure, the execution conditions include a theta join execution condition and an equal join execution condition, and when performing, on the field group data according to the execution operations, the join operations that meet the execution conditions, to obtain the query result, the distributed computing platform is specifically configured to:

perform a theta join on the field group data according to the execution operations, to obtain an intermediate result that meets the theta join execution condition; and perform, according to the execution operations, an equal join on the intermediate result and field group data on which the theta join is not performed, to obtain a query result that meets the equal join execution condition.

It should be noted that for a specific working process of the distributed computing platform formed by the processors 801 in the foregoing embodiment, reference may be made to content in the method example corresponding to FIG. 5, and details are not described herein again.

In another embodiment of the present disclosure, after reading the data of the fields in the to-be-built first field group and the to-be-built second field group, the distributed computing platform is further configured to:

determine whether the execution conditions include a single table filtering condition; and if the execution conditions include the single table filtering condition, filter the read data based on the single table filtering condition, where when performing the operation of grouping the read data based on the to-be-built first field group and the to-be-built second field group, to form field group data, the distributed computing platform is specifically configured to:

group filtered data based on the to-be-built first field group and the to-be-built second field group, to form the field group data.

In another embodiment of the present disclosure, after grouping the read data based on the to-be-built field groups, to form the field group data, the distributed computing platform is further configured to:

determine that the execution conditions include a primitive equal join execution condition, and perform an equal join on the field group data based on the primitive equal join execution condition and according to the execution operations, where when performing the join on the field group data according to the execution operations, to obtain the query result that meets the execution conditions, the distributed computing platform is specifically configured to perform, according to the execution operations, a join on the field group data on which the equal join is performed, to obtain the query result that meets the execution conditions.

It should be noted that for a specific working process of the distributed computing platform formed by the processors 801 in the foregoing embodiment, reference may be made to content in the corresponding method example, and details are not described herein again.

The embodiments disclosed above are described to enable a person skilled in the art to implement or use the present disclosure. Various modifications to the embodiments are obvious to the person skilled in the art, and general principles defined in this specification may be implemented in other embodiments without departing from the spirit or scope of the present disclosure. Therefore, the present disclosure should not be limited to the embodiments described in this specification, and should be applied to the widest scope that complies with the principles and novelty disclosed in this specification.

What is claimed is:

1. A control method for performing a multi-table join operation, comprising:

parsing a query statement, to obtain query conditions, table names, and fields that are in tables corresponding to the table names and that are used in the query statement, the query conditions comprising a theta join operation;

determining whether a table that participates in the theta join operation meets a first preset condition, wherein the first preset condition indicates that a quantity of fields in the table that are used in the query statement exceeds a first preset threshold; storage overheads of the fields in the table that are used in the query statement exceed a first preset space threshold; a quantity of the fields in the table that are used in the query statement and that participate in the theta join operation exceeds a second preset threshold; or storage overheads of the fields in the table that are used in the query statement and that participate in the theta join operation exceed a second preset space threshold;

identifying a table that meets the first preset condition as a first type table;

identifying a table that does not meet the first preset condition as a second type table in the tables corresponding to the table names;

decomposing fields in the first type table that are used in the query statement, to obtain a plurality of field groups comprising a first field group that is formed by using a field in the first type table that participates in the theta join operation and a second field group that is formed by using a field in the first type table that does not participate in the theta join operation;

obtaining a third field group of the second type table by using a field in the second type table that is used in the query statement; and generating an execution plan based on the query statement, the first field group, the second field group, and the third field group, wherein the execution plan is used to control to read data corresponding to fields in the first field group, the second field group, and the third field group, and perform, on the read data according to execution operations, a join operation that meets an execution condition, to obtain a query result that meets a requirement of the query statement.

2. The control method according to claim 1, wherein the decomposing fields in the first type table that are used in the query statement, to obtain the first field group and the second field group of the first type table comprises:

for the first type table, separately forming a first subtype field group by using a primary key and a field that is in the table and that participates in the theta join operation, and forming a second subtype field group by using the primary key and a field that is in the table and that is used in the query statement but does not participate in the theta join operation, wherein the generating an execution plan based on the query statement, the first field group, the second field group, and the third field group comprises:

generating the execution plan based on the query statement, the first subtype field group, the second subtype field group, and the third field group, wherein the execution plan is used to control to read data corresponding to fields in the first subtype field group, the second subtype field group, and the third field group, and perform, on the read data according to the execution operations, the join operations that meet execution conditions, to obtain the query result that meets the requirement of the query statement.

3. The control method according to claim 2, wherein the forming a first subtype field group by using a primary key and a field that is in the table and that participates in the theta join operation comprises:

forming one first subtype field group by using the primary key and all fields in the table that participate in the theta join operation; or forming one first subtype field group by using the primary key and a field that is in the table and that is used to perform a theta join operation with a field in a same table.

4. The control method according to claim 2, after the forming the first subtype field group and the second subtype field group, further comprising:

if fields in the first subtype field group of the first type table are used to participate in a multi-table theta join operation, decomposing the first subtype field group according to a preset rule, to obtain a plurality of field groups, wherein the preset rule comprises: a field that is in the first subtype field group and that is used to perform a theta join with a same table is decomposed as a field group, and a field shared by any two field groups obtained through decomposition meets a third preset condition, wherein the third preset condition is used to determine a correlation between two field groups formed through decomposition;

determining whether all the plurality of field groups obtained through decomposition comprise the primary key; and if not all the plurality of field groups obtained through decomposition comprise the primary key, adding the primary key to a field group that comprises no primary key, and returning to perform the operation of generating the execution plan based on the query statement, the first subtype field group, the second subtype field group, and the third field group; or if all the plurality of field groups obtained through decomposition comprise the primary key, returning to perform the operation of generating the execution plan based on the query statement, the first subtype field group, the second subtype field group, and the third field group.

5. The control method according to claim 2, before the generating the execution plan based on the query statement, the first subtype field group, the second subtype field group, and the third field group, further comprising:

if fields in the first subtype field group of the first type table meet a second preset condition, decomposing the first subtype field group, to obtain a plurality of field groups;

determining whether all the plurality of field groups obtained by decomposing the first subtype field group that meets the second preset condition comprise the primary key; and if not all the plurality of field groups obtained by decomposing the first subtype field group that meets the second preset condition comprise the primary key, adding the primary key to a field group that comprises no primary key, and returning to perform the operation of generating the execution plan based on the query statement, the first subtype field group, the second subtype field group, and the third field group; or if all the plurality of field groups obtained by decomposing the first subtype field group that meets the second preset condition comprise the primary key, returning to perform the operation of generating the execution plan based on the query statement, the first subtype field group, the second subtype field group, and the third field group.

6. The control method according to claim 5, wherein the second preset condition comprises:

a quantity of fields in the first subtype field group exceeds a third preset threshold; or storage overheads of the fields in the first subtype field group exceed a third preset space threshold.

7. A control method for performing a multi-table join, comprising:

receiving an execution plan, wherein the execution plan comprises a to-be-built first field group, a to-be-built second field group, execution operations, and execution conditions, wherein the to-be-built first field group and the to-be-built second field group are formed by decomposing fields of a table that meets a first preset condition, wherein the first preset condition indicates that a quantity of the fields in the table that are used in a query statement comprising a theta join operation exceeds a first preset threshold; storage overheads of the fields in the table that are used in the query statement exceed a first preset space threshold; a quantity of the fields in the table that are used in the query statement and that participate in the theta join operation exceeds a second preset threshold; or storage overheads of the fields in the table that are used in the query statement and that participate in the theta join operation exceed a second preset space threshold, wherein the to-be-built first field group is formed by using a field in the table that participates in the theta join operation and the to-be-built second field group is formed by using a field in the table that does not participate in the theta join operation;

reading data corresponding to fields in the to-be-built first field group and the to-be-built second field group;

grouping the read data based on the to-be-built first field group and the to-be-built second field group, to form field group data;

performing, on the field group data according to the execution operations, join operations that meet the execution conditions, to obtain a query result;

mapping the query result to an output field sequence; and sending the output field sequence.

8. The control method according to claim 7, after the reading data of fields in the to-be-built first field group and the to-be-built second field group, further comprising:

determining whether the execution conditions comprise a single table filtering condition; and if the execution conditions comprise the single table filtering condition, filtering the read data based on the single table filtering condition, wherein the grouping the read data based on the to-be-built first field group and the to-be-built second field group, to form field group data comprises:

grouping filtered data based on the to-be-built first field group and the to-be-built second field group, to form the field group data.

9. The control method according to claim 7, wherein the execution conditions comprise a theta join execution condition and an equal join execution condition; and the performing, on the field group data according to the execution operations, join operations that meet the execution conditions, to obtain a query result comprises:
   performing a theta join on the field group data according to the execution operations, to obtain an intermediate result that meets the theta join execution condition; and
   performing, according to the execution operations, an equal join on the intermediate result and field group data on which the theta join is not performed, to obtain a query result that meets the equal join execution condition.

10. The control method according to claim 7, after the grouping the read data based on the to-be-built first and second field groups, to form field group data, further comprising:
   determining that the execution conditions comprise a primitive equal join execution condition, and performing an equal join on the field group data based on the primitive equal join execution condition and according to the execution operations, wherein
   the performing a join on the field group data according to the execution operations, to obtain a query result that meets the execution conditions comprises:
   performing, according to the execution operations, a join on the field group data on which the equal join is performed, to obtain the query result that meets the execution conditions.

11. An optimizer apparatus, comprising:
    a memory; and
    a processor coupled to the memory, wherein the processor is configured to perform operations comprising:
    parsing a query statement, to obtain query conditions, table names, and fields that are in tables corresponding to the table names and that are used in the query statement, the query conditions comprising a theta join operation;
    determining whether a table that participates in the theta join operation meets a first preset condition, wherein the first preset condition indicates that a quantity of fields in the table that are used in the query statement exceeds a first preset threshold; storage overheads of the fields in the table that are used in the query statement exceed a first preset space threshold; a quantity of the fields in the table that are used in the query statement and that participate in the theta join operation exceeds a second preset threshold; or storage overheads of the fields in the table that are used in the query statement and that participate in the theta join operation exceed a second preset space threshold;
    identifying a table that meets the first preset condition as a first type table;
    identifying a table that does not meet the first preset condition as a second type table in the tables corresponding to the table names;
    decomposing fields in the first type table that are used in the query statement, to obtain a plurality of field groups comprising a first field group that is formed by using a field in the first type table that participates in the theta join operation and a second field group that is formed by using a field in the first type table that does not participate in the theta join operation;
    obtaining a third field group of the second type table by using a field in the second type table that is used in the query statement; and generating an execution plan based on the query statement, the first field group, and the second field group,
    wherein the execution plan is used to control to read data corresponding to fields in the first field group, the second field group, and the third field group, and perform, on the read data according to execution operations, a join operation that meets an execution condition, to obtain a query result that meets a requirement of the query statement.

12. The optimizer apparatus according to claim 11, wherein when decomposing the fields in the first type table that are used in the query statement, to obtain the first field group and the second field group of the first type table, the processor is configured to:
    for the first type table, separately form a first subtype field group by using a primary key and a field that is in the table and that participates in the theta join operation, and form a second subtype field group by using the primary key and a field that is in the table and that is used in the query statement but does not participate in the theta join operation, wherein
    when generating the execution plan based on the query statement, the first field group, the second field group, and the third field group the processor is configured to:
    generate the execution plan based on the query statement, the first subtype field group, the second subtype field group, and the third field group, wherein the execution plan is used to control to read data corresponding to fields in the first subtype field group, the second subtype field group, and the third field group, and perform, on the read data according to the execution operations, the join operations that meet execution conditions, to obtain the query result that meets the requirement of the query statement.

13. The optimizer apparatus according to claim 12, wherein when performing the operation of forming a first subtype field group by using a primary key and a field that is in the table and that participates in the theta join operation, the processor is configured to:
    form one first subtype field group by using the primary key and all fields in the table that participate in the theta join operation; or
    form one first subtype field group by using the primary key and a field that is in the table and that is used to perform a theta join operation with a field in a same table.

14. The optimizer apparatus according to claim 12, wherein after forming the first subtype field group and the second subtype field group, the processor is further configured to:
    if it is determined that fields in the first subtype field group of the first type table are used to participate in a multi-table theta join operation, decompose the first subtype field group according to a preset rule, to obtain a plurality of field groups, wherein the preset rule comprises: a field that is in the first subtype field group and that is used to perform a theta join with a same table is decomposed as a field group, and a field shared by any two field groups obtained through decomposition meets a third preset condition, wherein the third preset condition is used to determine a correlation between two field groups formed through decomposition; determine whether all the plurality of field groups obtained through decomposition comprise the primary key; and if not all the plurality of field groups obtained through decomposition comprise the primary key, add the primary key to a field group that comprises no primary key, wherein the processor is further configured to: after adding the primary key to the field group that comprises no primary key, and after determining that all the plurality of field groups obtained through decomposition comprise the primary key, perform the operation of generating the execution plan based on the query statement, the first subtype field group, the second subtype field group, and the third field group.

15. The optimizer apparatus according to claim 12, wherein before generating the execution plan based on the query statement, the first subtype field group, the second subtype field group, and the third field group, the processor is further configured to:

if it is determined that fields in the first subtype field group of the first type table meet a second preset condition, decompose the first subtype field group, to obtain a plurality of field groups; determine whether all the plurality of field groups obtained by decomposing the first subtype field group that meets the second preset condition comprise the primary key; and if not all the plurality of field groups obtained by decomposing the first subtype field group that meets the second preset condition comprise the primary key, add the primary key to a field group that comprises no primary key, wherein the processor is further configured to: after adding the primary key to the field group that comprises no primary key, and after determining that all the plurality of field groups obtained by decomposing the first subtype field group that meets the second preset condition comprise the primary key, perform the operation of generating the execution plan based on the query statement, the first subtype field group, the second subtype field group, and the third field group.

16. The optimizer apparatus according to claim 15, wherein the second preset condition comprises:

a quantity of fields in the first subtype field group exceeds a third preset threshold; or storage overheads of the fields in the first subtype field group exceed a third preset space threshold.

17. A server cluster, comprising:

one or more processors and one or more memories coupled to the one or more processors to form a distributed computing platform, wherein the one or more processors are configured to:

receive an execution plan, wherein the execution plan comprises a to-be-built first field group, a to-be-built second field group, execution operations, and execution conditions, wherein the to-be-built first field group and the to-be-built second field group are formed by decomposing fields of a table that meets a first preset condition, wherein the first preset condition indicates that a quantity of the fields in the table that are used in a query statement comprising a theta join operation exceeds a first preset threshold; storage overheads of the fields in the table that are used in the query statement exceed a first preset space threshold; a quantity of the fields in the table that are used in the query statement and that participate in the theta join operation exceeds a second preset threshold; or storage overheads of the fields in the table that are used in the query statement and that participate in the theta join operation exceed a second preset space threshold, wherein the to-be-built first field group is formed by using a field in the table that participates in the theta join operation and the to-be-built second field group is formed by using a field in the table that does not participate in the theta join operation;

read data corresponding to fields in the to-be-built first field group and the to-be-built second field group;

group the read data based on the to-be-built first field group and the to-be-built second field group, to form field group data;

perform, on the field group data according to the execution operations, join operations that meet the execution conditions, to obtain a query result;

map the query result to an output field sequence; and send the output field sequence; and memories of the n servers form a distributed storage system, configured to store the data corresponding to the fields.

18. The server cluster according to claim 17, wherein after reading the data of the fields in the to-be-built first field group and the to-be-built second field group, the one or more processors are further configured to:

determine whether the execution conditions comprise a single table filtering condition; and if the execution conditions comprise the single table filtering condition, filter the read data based on the single table filtering condition, wherein when performing the operation of grouping the read data based on the to-be-built first field group and the to-be-built second field group, to form field group data, the one or more processors are configured to:

group filtered data based on the to-be-built first field group and the to-be-built second field group, to form the field group data.

19. The server cluster according to claim 17, wherein the execution conditions comprise a theta join execution condition and an equal join execution condition; and when performing, on the field group data according to the execution operations, the join operations that meet the execution conditions, to obtain the query result, the one or more processors are configured to:

perform a theta join on the field group data according to the execution operations, to obtain an intermediate result that meets the theta join execution condition; and perform, according to the execution operations, an equal join on the intermediate result and field group data on which the theta join is not performed, to obtain a query result that meets the equal join execution condition.

20. The server cluster according to claim 17, wherein after grouping the read data based on the to-be-built first and second field groups, to form the field group data, the one or more processors are further configured to:

determine that the execution conditions comprise a primitive equal join execution condition, and perform an equal join on the field group data based on the primitive equal join execution condition and according to the execution operations, wherein when performing the join on the field group data according to the execution operations, to obtain the query result that meets the execution conditions, the distributed computing platform is configured to:

perform, according to the execution operations, a join on the field group data on which the equal join is performed, to obtain the query result that meets the execution conditions.

* * * * *